UNITED STATES PATENT OFFICE.

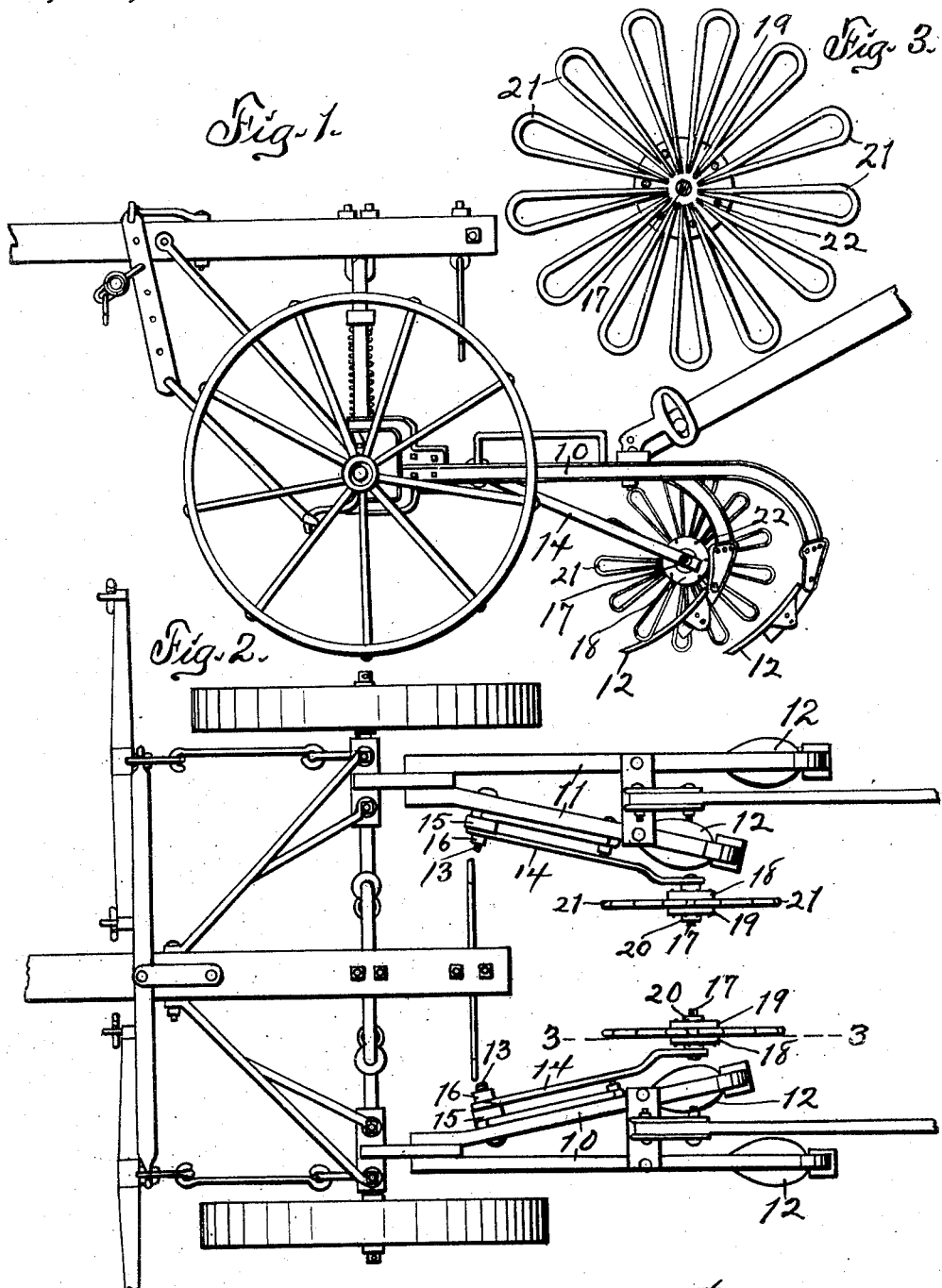

HUGH H. MUNSON, OF TRURO, IOWA.

REVOLVING CLOD-FENDER.

1,025,420.

Specification of Letters Patent. Patented May 7, 1912.

Application filed June 19, 1911. Serial No. 634,159.

*To all whom it may concern:*

Be it known that I, HUGH H. MUNSON, citizen of the United States of America, and resident of Truro, Madison county, Iowa, have invented a new and useful Revolving Clod-Fender, of which the following is a specification.

The object of this invention is to provide an improved construction for clod fenders for cultivators.

A further object of this invention is to provide an improved attachment for cultivators adapted to prevent the rolling of clods against young corn being cultivated.

A further object of this invention is to provide an improved revolving clod fender which shall not have a tendency to gather an accumulation of weeds, stalks and vines liable to damage young corn being cultivated.

My invention consists in the construction, arrangement and combination of elements hereinafter set forth, pointed out in my claims and illustrated by the accompanying drawing, in which—

Figure 1 is a side elevation of a cultivator equipped with my improvement, portions being broken away to economize space. Fig. 2 is a plan of the same. Fig. 3 is a detail vertical section on an enlarged scale on the indicated line 3—3 of Fig. 2.

In the drawing I have illustrated a one-row, straddle cultivator which may be of any desired form and construction.

The numerals 10, 11 designate generally cultivator beams which are equipped with cultivating devices 12 such as shovels. Bolts 13 are mounted horizontally through the forward portions of the cultivator beams 10, 11 and a stem 14 is pivoted at one end on each bolt and extends rearwardly and downwardly therefrom. Each stem 14 preferably is spaced from the beam 10 or 11 by a washer 15 and is held in place by a nut 16 screwed on the outer end of its bolt. The stems 14 preferably converge rearwardly and are bent into parallel relations at their rear end portions. Pivot bolts 17 are mounted through the rear end portions of the stems 14 and clamp plates 18, 19 are mounted in spaced relations and are free to revolve thereon. The pivot bolts 17 are provided with nuts 20 on their inner ends. Radiating spokes 21 are formed of separate loops of wire and are received at their open ends between the clamp plates 18, 19 and held firmly in place by bolts 22 passing through and clamping together the plates 18, 19. The looped outer ends of the spokes 21 form the periphery of a wheel or circular fender, which periphery is adapted to contact with the ground and cause the wheel to revolve in advance of the cultivator. The revolving fenders thus formed are disposed in spaced parallel relations between the cultivator beams 10, 11 and are adapted to travel on opposite sides of a row of corn being cultivated. Clods turned up by the cultivating devices 12 are prevented by the fenders from falling upon or rolling against and burying or otherwise damaging young corn being cultivated. The revolving feature of the fenders is of advantage in that it prevents weeds, old stalks, vines and the like from accumulating in front of the fenders and forming a drag liable to injure the corn. Any such obstacle or accumulation encountered by the fenders is rolled over and left behind as the fender revolves in advance of the cultivator. The fenders may be removed from the beams 10, 11 when desired by removing the nuts 16 and bolts 15.

I do not desire to be understood as limiting myself to the exact form and arrangement of parts shown as various modifications thereof may be employed without departing from the spirit of my invention.

I claim as my invention—

1. A revolving clod fender, comprising a suitable hub and spokes radiating therefrom, said spokes being formed of looped wire secured to the hub at their open ends.

2. A revolving clod fender, comprising a suitable hub and spokes radiating therefrom, said spokes formed of separate loops of wire clamped to the hub at their open ends, the closed ends of the loops forming the periphery of the fender.

3. A revolving clod fender, comprising a stem, a pivot bolt therein, spaced clamp plates on said pivot bolt, bolts connecting said clamp plates, and spokes clamped at their inner ends between said plates, said spokes formed of separate loops of wire, the looped ends of said spokes adapted to contact with and roll on the ground.

4. In combination with a cultivator having spaced beams, stems fixed at their forward ends to said beams, said stems converging rearwardly and bent into parallel planes at their rear end portions, pivot bolts in rear end portions of said stems, and revolving clod fenders mounted on said pivot bolts and spaced apart, said fenders comprising radiating spokes of looped wire clamped together at their open ends.

Signed by me at Truro, Iowa, this 9th day of June, 1911.

HUGH H. MUNSON.

Witnesses:
T. R. JEFFRIES,
L. SARHILL.